US012489947B2

United States Patent
Hassem et al.

(10) Patent No.: US 12,489,947 B2
(45) Date of Patent: Dec. 2, 2025

(54) SYSTEMS AND METHOD OF DETECTING TELEVISION STATE BASED ON MACHINE LEARNING

(71) Applicant: Kantar Group Limited, London (GB)

(72) Inventors: Moreno Addad Hassem, São Paulo (BR); Eduardo Palmeira, Taubaté (BR)

(73) Assignee: Kantar Media Audiences Limited (GB)

(*) Notice: Subject to any disclaimer, the term of this patent is extended or adjusted under 35 U.S.C. 154(b) by 169 days.

(21) Appl. No.: 18/452,833

(22) Filed: Aug. 21, 2023

(65) Prior Publication Data

US 2025/0071376 A1 Feb. 27, 2025

(51) Int. Cl.
| | |
|---|---|
| H04N 21/442 | (2011.01) |
| G06F 1/28 | (2006.01) |
| H04N 21/466 | (2011.01) |
| H04N 21/482 | (2011.01) |

(52) U.S. Cl.
CPC ......... *H04N 21/44218* (2013.01); *G06F 1/28* (2013.01); *H04N 21/4667* (2013.01); *H04N 21/482* (2013.01)

(58) Field of Classification Search
CPC ........... H04N 21/251; H04N 21/42202; H04N 21/44218; H04N 21/4436; H04N 21/4667
See application file for complete search history.

(56) References Cited

U.S. PATENT DOCUMENTS

| | | | |
|---|---|---|---|
| 2011/0183733 A1* | 7/2011 | Yoshida | A63F 13/65 463/1 |
| 2018/0168515 A1* | 6/2018 | Farahmand | A61B 5/725 |
| 2018/0181878 A1* | 6/2018 | Kasiviswanathan | G06F 21/6245 |
| 2019/0012604 A1* | 1/2019 | Hiratsuka | G06Q 30/0201 |
| 2020/0125470 A1* | 4/2020 | Cui | G01R 21/133 |
| 2022/0159342 A1* | 5/2022 | Anderson | H04N 21/25891 |
| 2023/0419106 A1* | 12/2023 | Mimaroglu | G06N 3/048 |

OTHER PUBLICATIONS

International Search Report and Written Opinion on PCT Application PCT/US2024/040933 dated Oct. 22, 2024.
Vv.Aa.: "Introduction to Machine Learning 1-20 Contents", Jul. 13, 2015, pp. 1-456, XP055867550, Retrieved from the Internet: URL:http://www.datascienceassn.org/sites/default/files/Introduction%20to%20Machine%2 OLearning.pdf [retrieved on Nov. 30, 2021] p. 50-p. 64.
https://cloud.google.com/blog/products/ai-machine-learning/monitoring-home-appliances-from-power-readings-with-ml

* cited by examiner

*Primary Examiner* — Jason Salce
(74) *Attorney, Agent, or Firm* — Foley & Lardner LLP

(57) ABSTRACT

Server to server direct integration is provided. A system constructs an array of power values from time series data collected by a power sensor coupled with a television. The system inputs the array of power values into a model trained with machine learning based on log files of data collected from a plurality of power sensors coupled with a plurality of televisions. The system determines, based on output from the model generated with the array of power values, the television is active. The system executes, responsive to the determination that the television is active, an action to evaluate a performance of content rendered by the television.

18 Claims, 4 Drawing Sheets

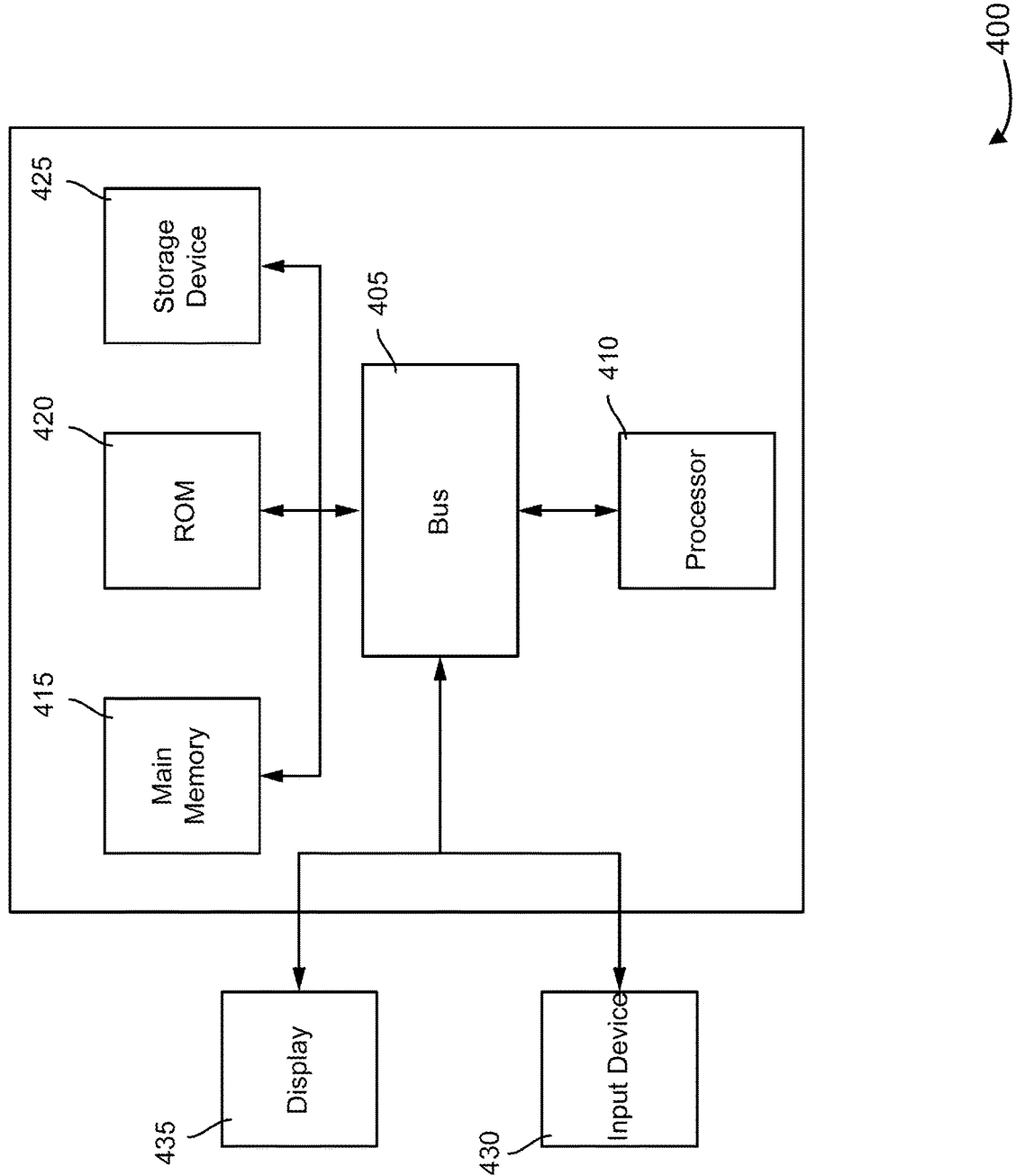

SYSTEMS AND METHOD OF DETECTING TELEVISION STATE BASED ON MACHINE LEARNING

BACKGROUND

Televisions can operate at different power levels. For example, based on the display technology or processing capabilities of a television, the television an consume different amounts of power when in operation. Due to the increasingly varying types of televisions and display technology, it can be challenging to efficiently evaluate the performance of a television in an effective and reliable manner.

SUMMARY

An aspect of this disclosure can be directed to a system of state-based performance evaluation of televisions via machine learning. The system can include a computing system comprising one or more processors, coupled with memory. The computing system can construct an array of power values from time series data collected by a power sensor coupled (e.g., electrically coupled) to a television. The computing system can input the array of power values into a model trained with machine learning based on log files of data collected from a plurality of power sensors coupled with a plurality of televisions. The computing system can determine, based on output from the model generated with the array of power values, the television is active. The computing system can execute, responsive to the determination that the television is active, an action to evaluate a performance of content rendered by the television.

An aspect of this disclosure can be directed to a method. The method can include constructing, by a computing system comprising one or more processors coupled with memory, an array of power values from time series data collected by a power sensor coupled with a television. The method can include inputting, by the computing system, the array of power values into a model trained with machine learning based on log files of data collected from a plurality of power sensors coupled with a plurality of televisions. The method can include determining, by the computing system, based on output from the model generated with the array of power values, the television is active. The method can include executing, by the computing system, responsive to the determination that the television is active, an action to evaluate a performance of content rendered by the television.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 is a block diagram illustrating an architecture for a computer system that can be employed to implement elements of the systems and methods described and illustrated herein, including aspects of the system depicted in FIG. 1 and the methods depicted in FIG. 2 and FIG. 3.

DETAILED DESCRIPTION

Following below are more detailed descriptions of various concepts related to, and implementations of, methods, apparatuses, and systems for detecting television state based on machine learning. The various concepts introduced above and discussed in greater detail below may be implemented in any of numerous ways.

This disclosure is directed to systems, methods, and apparatuses for detecting television state based on machine learning. Some televisions may have two main states of operation, either off or on. The states of operation can be delineated based on an amount of power the television is consuming. While in an on state, a system may assume that an audience is present, and perform one or more actions. However, as television technology continues to become more sophisticated, various states of operation may be introduced, where each state may be associated with a different power level based on a type of the television (e.g., quantum dot light emitting diode (QLED), organic light emitting diode (OLED), various types of manufacturers, monitor size, computational power, etc.). Due to differences in television technologies and power usage behaviors, determining the state of televisions may be inaccurate and difficult to predict. Some solutions may utilize a custom algorithm for each type of television, however, having custom algorithms for each type of television may require knowledge of the type of television and may further result in inefficient usage of resources, large overhead costs to develop the algorithms, and a short duration of effectiveness or accuracy due to the changing landscape of television technology.

This technical solution can overcome the aforementioned technical deficiencies. For example, the technical solution can provide a machine learning model trained to detect a television state agnostic of the type of television, and modifiable over time as new models are aggregated to a training sample set. To do so, the technical solution can train a model with machine learning based on log files of data collected from multiple power sensors coupled (e.g., electrically coupled, communicatively coupled) to multiple types of televisions. The technical solution can construct an array of power values from data collected by a power sensor coupled with a television and input the array of power values into the model. The technical solution can determine, based on output form the model, a state of the television. The technical solution can determine whether, and what, action to execute based on the determined state of the television.

Figure 1:
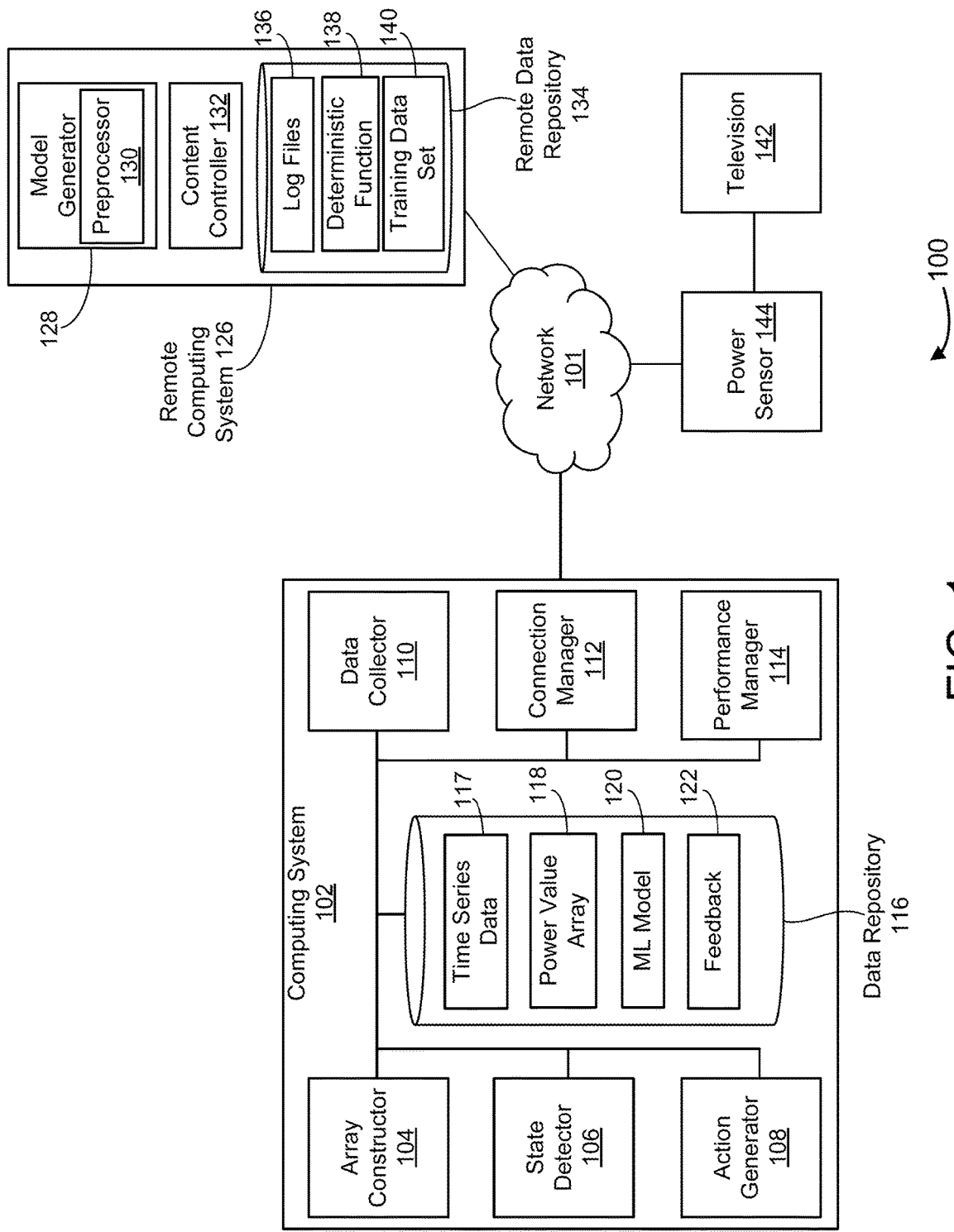
FIG. 1 depicts an example system of detecting television state based on machine learning, according to an embodiment.

FIG. 1 depicts an example system 100 of detecting television state based on machine learning. The system 100 can include a computing system 102. The computing system 102 can include an array constructor 104 to construct an array of power values to input into a model trained with machine learning. The computing system 102 can include a state detector 106 to determine a state of a television 142. The television 142 can include any telecommunication medium for transmitting moving images and sound, including digital televisions, plasma displays, light emitting diode or organic light emitting diode displays, computer monitors, tablet devices, personal or handheld devices, or cathode ray tube devices, among other device architectures. The computing system 102 can include an action generator 108 to generate and execute an action based on the determined state of the television 142. The computing system 102 can include a data collector 110 to collect data, such as time series data, from a power sensor 144 via a network 101. The computing system 102 can include a connection manager 112 to manage connections between the computing system 102 and at least one of the power sensor 144, the television 142, or a remote computing system 126. The computing system 102 can include a performance manager 114 to process feedback 122 and determine performance of content rendered via the television 142. The computing system 102 can include a data repository 116 to store and manage data, such as time series data 117, a power value array 118, a machine learning model 120, and the feedback 122. The remote computing system 126 can include a model generator 128 to train the model with machine learning based on training data 140. The model generator 128 can include a preprocessor 130 to process log files 136 and generate the training data 140. The remote computing system 126 can include a content controller 132 to control content rendered via the television 142. The remote computing system 126 can include a remote data repository 134 to store and manage data, such as the log files 136, a deterministic function 138, and the training data 140.

The computing system 102 can interface with, communicate with, or otherwise receive or provide information with one or more of the remote computing system 126, the power sensor 144, or the television 142 via the network 101. The computing system 102, the remote computing system 126, the power sensor 144, or the television 142 can each include at least one logic device such as a computing device having a processor to communicate via the network 101. The computing system 102, the remote computing system 126, the power sensor 144, or the television 142 can include at least one computation resource, server, processor, or memory. For example, the computing system 102 can include a plurality of computation resources or processors coupled with memory. Any one of the computing system 102, the remote computing system 126, the power sensor 144, or the television 142 can be included in a same system (e.g., the television 142 may include the power sensor 144, the computing system 102 may include the power sensor 144, the television 142 may include the computing system 102, the remote computing system 126 may include the computing system 102, etc.).

The network 101 can include computer networks such as the Internet, local, wide, metro, or other area networks, intranets, satellite networks, and other communication networks such as voice or data mobile telephone networks. The network 101 can include wired or wireless networks, connections, or communication channels. The network 101 can be used to transmit or receive information or commands to or from various components or sources. The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network, or a wireline network.

The computing system 102 or the remote computing system 126 can be part of or include a cloud computing environment. The computing system 102 or the remote computing system 126 can include multiple, logically grouped servers and facilitate distributed computing techniques. The logical group of servers may be referred to as a data center, server farm, or a machine farm. The servers can also be geographically dispersed. A data center or a machine farm may be administered as a single entity, or the machine farm can include a plurality of machine farms. The servers within each machine farm can be heterogeneous-one or more of the servers or machines can operate according to one or more type of operating system platform. In some implementations, the computing system 102 may be a type of client device, such as a computer, a laptop, a tablet, a phone, or any other type of device including one or more processors and memory capable of performing the functions as described herein. In some implementations, the remote computing system 126 may perform any or all actions or functions performed by the computing system 102. In some implementations, the computing system 102 may perform any or all actions or functions performed by the remote computing system 126.

The remote computing system 126 can be remote from the computing system 102. The model generator 128, the preprocessor 130, and the content controller 132 can each communicate with the remote data repository 134 or database. The remote computing system 126 can include or otherwise access the remote data repository 134. The remote data repository 134 can include one or more data files, data structures, arrays, values, or other information that facilitates operation of the remote computing system 126. The remote data repository 134 can include one or more local or distributed databases and can include a database management system.

The remote data repository 134 can include, maintain, or manage one or more log files 136. The log files 136 can include one or more parameters associated with respective televisions and power sensors. For example, the remote computing system 126 can communicate or interact with one or more televisions 142 to populate the log files 136 with values or obtain the log files 136 prepopulated. The values may include a timestamp, power consumption of the television, a power level, an indication of whether a connection of the television is stable (e.g., whether the reading is reliable, trustworthy), thresholds determined by a deterministic algorithm for an inferred state, or a time series of power readings, among other values. In some cases, each television 142 may be electrically coupled with a respective power sensor 144. In some cases, each television 142 may be coupled via other means (e.g., magnetic fields, optical/photodetectors, acoustics, camera, included in the television 142, etc.) to the respective power sensor 144. The power sensor 144 may obtain (e.g., collect, capture, read) the values and transmit (e.g., via the network 101, via a wireless connection, via Bluetooth) the values as a log file to a respective computing system 102. The computing system 102 may receive the log file and transmit the log file to the remote computing system 126.

The remote data repository 134 can include, maintain, or manage one or more deterministic functions 138. Each deterministic function 138 may be configured for a respective type of television to output an indication (e.g., a Boolean value, one or more bits) of a state of the television during a period of time. For example, the remote computing system 126 may be in communication with multiple televisions 142 of different types. The remote computing system 126 may receive the log files 136 from respective computing systems 102 associated with the televisions 142 via the network 101. The remote computing system 126 may execute a respective deterministic function 138 based on the log files 136 and obtain as output the indication of the state of the television for each timestamp of the log files 136. In some cases, the remote computing system 126 may include the output in the log files 136. In some cases, the respective computing systems 102 may include a respective deterministic function 138 associated with the television 142 and may send the log files 136 with the output to the remote computing system 126.

The remote data repository 134 can include, maintain, or manage one or more sets of training data 140. The sets of training data 140 may include data from the log files 136 and the output of the deterministic function 138. For example, the preprocessor 130 can process the log files 136 and generate the training data 140. To do so, the preprocessor 130 can apply one or more data cleaning techniques to the data of the log files 136 to generate a cleaned data set. The preprocessor 130 can apply one or more data cleaning techniques to each of the individual log files (e.g., multiple days of data), or can aggregate, append, or otherwise combine the multiple log files prior to applying the data cleaning technique. For example, the preprocessor 130 can combine the data from the multiple log files 136, and then apply one or more data cleaning techniques to the entire data set of the log files 136. Example data cleaning techniques the preprocessor 130 can apply include: handling missing values (e.g., interpolation); outlier detection and resolution; data standardization or normalization; de-duplication; encoding categorical variables; addressing inconsistent values; scrubbing or filtering irrelevant features; or time-series data cleaning.

For example, the preprocessor 130 may apply a normalization technique to the cleaned data set to generate a normalized data set. The normalization technique may include calculating maximum and minimum values for the type of television associated with the log files 136 and performing a clipping technique. Other types of normalization techniques may be used, such as linear scaling, log scaling, or z-score, among other types. The preprocessor 130 may remove, from the normalized data set, spikes (among other types of data) via a filter to generate a filtered data set. The spikes may include power values that satisfy a threshold for a short period of time (e.g., potentially indicating that the television 142 was on for a short amount of time, potentially indicating that an audience was not present at the television 142). The preprocessor 130 may interpolate missing values in the filtered data set to generate a training data set 140. The preprocessor 130 may utilize one or more types of interpolation techniques, such as averaging the data before and after the missing value, calculating a line (or polynomial) of best fit and estimating the missing value, kriging, linear interpolation, natural neighbor, or weighting, among other types of techniques. Due to the processing techniques (e.g., the normalization techniques) multiple types of televisions 142 may be included in the training data set 140 to train a model 120 that can determine a state of a television 142 agnostic to the type of the television 142.

The remote data repository 134 can include the model generator 128 designed, constructed, and operational to train a model with machine learning based on the training data set 140. The model can be a model, a machine learning algorithm, or a model trained with a machine learning algorithm. The model can be a supervised or unsupervised machine learning model. For example, the model can recognize or identify patterns in data without any, or with minimal, user supervision. The model can be a model or machine learning algorithm that scores the importance of input parameters, features, or variables. The model can be a model or machine learning algorithm that includes historical data to generate an output. In some cases, the model or machine learning algorithm may be a long short-term memory (LSTM) network, or other type of memory network.

The model generator 128 can execute the machine learning algorithm using the training data set 140 as input. The model generator 128 can execute the machine learning algorithm responsive to the preprocessor 130 processing the log files 136 and generating the training data set 140. In some implementations, the model generator 128 may generate labels for the training data set 140 based on the output of the deterministic function 138. The labels can indicate a state of the television 142 (e.g., on, off, standby, sleep, hibernation, updating, power saving mode, night mode, dim screen, etc.). The model generator 128 may tune one or more hyperparameters. For example, the model generator 128 may determine a number of layers and a number of cells per layer of the machine learning algorithm for training the model. To do so, the model generator 128 may execute multiple machine learning algorithms based on the training data set 140. The model generator 128 may compare an output of the machine learning algorithm to a ground truth value (e.g., the output of the deterministic function 138). The model generator 128 may determine the hyperparameters for a machine learning model 120 based on the comparison (e.g., an accuracy of the model output to the deterministic function output, a precision of the model output to the deterministic function output, etc.). In some cases, once the model is trained, the hyperparameters tuned, etc., consecutive training of the model may not utilize the output of the deterministic function 138. The remote computing system 126 may transmit, via the network 101, the trained machine learning model 120 to the computing system 102.

The array constructor 104, the state detector 106, the action generator 108, the data collector 110, the connection manager 112, and the performance manager 114 can each communicate with the data repository 116 or database. The computing system 102 can include or otherwise access the data repository 116. The data repository 116 can include one or more data files, data structures, arrays, values, or other information that facilitates operation of the computing system 102. The data repository 116 can include one or more local or distributed databases and can include a database management system. The data repository 116 can include, maintain, or manage the time series data 117. The time series data 117 can include multiple power levels at respective time intervals (e.g., every 5 seconds, every minute, every hour, etc.). The computing system 102 can collect the time series data 117 or update the time series data 117 periodically, according to a configured schedule, or based on an event. The data repository 116 can include, maintain, or manage the power value array 118. The power value array 118 may include an array of power values from the time series data 117. The power value array 118 may be periodically updated based on a sliding window to combine previous power value arrays with subsequent power values from subsequent time series data 117. The data repository 116 can include, maintain, or manage the machine learning model 120. In some cases, the remote computing system 126 may communicate the machine learning model 120 to the computing system 102 or the computing system 102 may be configured with the machine learning model 120. The data repository 116 can include, maintain, or manage the feedback 122. The feedback 122 may include feedback from an audience. The feedback 122 may be or include feedback associated with content rendered via the television 142, feedback associated with an action to evaluate a performance of the content rendered, feedback associated with a state of the television 142, among other types of feedback.

The content rendered via the television 142 may be digital content. T content may be shown to an audience (e.g., users, onlookers, spectators, watchers). The television 142 can provide the content as part of a campaign or advertisement. The television 142 may be part of a measuring television set configured to meter the audience and identify content to be rendered via the television 142 based on matching audio signatures. The television 142 may be any type of television (e.g., LED, QLED, OLED, or plasma). The digital content can include images, pictures, videos, frames, audio, or other data.

The connection manager 112 can be designed, constructed, and operational to manage connections between the computing system 102 and at least one of the power sensor 144, the television 142, or the remote computing system 126. In some implementations, the connection manager 112 may manage direct connections to any one of the power sensor 144, the television 142, or the remote computing system 126 or may manage indirect connections to any one of the power sensor 144, the television 142, or the remote computing system 126 via the network 101. The connections may be wireless communication sessions. For example, the connection manager 112 may establish a wireless communication session with the power sensor 144, the television 142, or the remote computing system 126.

To establish a connection or wireless communication session, the connection manager 112 can perform, facilitate, or otherwise execute a handshaking process. The handshaking process can be pursuant to a wireless networking protocol, such as a short-range wireless communication protocol (e.g., Bluetooth), Wi-Fi, or a nearfield communication protocol (e.g., NFC). In some cases, the communication can be wired (e.g., universal serial bus "USB", ethernet, or communication cable).

The connection manager 112 can establish a wireless communication session with the power sensor via an intermediary device, such as a hub, meter, gateway, or router. For example, the connection manager 112 can establish the wireless communication session via a hub to which a meter and power sensor are connected, such that the computing system 102 can receive the time series of power values from the meter. In some cases, the power sensor can refer to or include the meter or a metering system that can include or be coupled with a power sensor. The power sensor can be coupled with the television in a wired or wireless manner in order to determine, measure, monitor or otherwise identify an amount of power consumption of the television.

The data collector 110 can be designed, constructed, and operational to collect data. The data may include the time series data 117, the power value array 118, the machine learning model 120, the feedback 122, the log files 136, among other types of data. The power value can be in units of power such as watts or milliwatts. The power value can correspond to an amount of energy consumed over a time interval. The data collector 110 may receive the data from any one of the remote computing system 126, the television 142, the power sensor 144, or the network 101. The data collector 110 may use any communication protocol or application programming interface (API) to fetch, obtain, retrieve, query, request, or otherwise obtain the data. The data collector 110 may receive the time series data 117 from the power sensor 144 (e.g., via a connection managed by the connection manager 112, via a wireless communication session). The data collector 110 may receive the time series data 117 periodically (e.g., every 1 second, 2 seconds, 3 seconds, 5 seconds, 10 seconds, 15 seconds, 20 seconds, 30 seconds, one minute, or one hour), according to a schedule, sample rate, or triggered by an event (e.g., responsive to the power value exceeding a threshold, or detecting motion in the vicinity of the television). In some cases, the data collector 110 can receive the time series of power values in a batch mode or in an offline process, such as every 12 hours or 24 hours. In some implementations, the data collector 110 may receive the machine learning model 120 from the remote computing system 126 or the computing system 102 may be preconfigured to include the machine learning model 120 in the data repository 116. The data collector 110 may receive the feedback 122 from an audience. The data collector 110 may include an input interface for an audience to input the feedback 122. The data collector 110 may receive the feedback 122 via monitoring of the audience (e.g., via video or picture data, client device identifiers, matching audio signatures, audio data, etc.).

The array constructor 104 can be designed, constructed, and operational to construct an array of power values 118. The array constructor 104 can construct the array of power values 118 from the time series data 117 collected by the power sensor 144. The array constructor 104 can perform any parsing or extraction technique to identify the power values from the time series data 117. The array constructor 104 can perform data quality checks or validation checks. The array constructor 104 can apply an interpolation technique. For example, the array constructor 104 may identify an entry in the array of power values 118 that is null (e.g., empty, invalid, abnormal). The array constructor 104 may apply the interpolation technique to the array of power values 118 to generate a value to populate the null entry. The array constructor 104 may construct the array of power values 118 with the value generated via the interpolation technique.

In some cases, the data collector 110 may collect second time series data 117 from the power sensor 144. The array constructor 104 may apply a sliding window to construct a second array of power values 118 based on a combination of the second time series data 117 and the first time series data 117 (e.g., a combination of the previous time series data and the subsequent time series data). The sliding window may be a window of valid values, where an oldest value may be removed from the array of power values 118 and a newest value may be added to the array of power values 118. The sliding window may use a first in first out method. The oldest value may be a value preceding the other values and the newest value may be a value subsequent to the other values. In some cases, the array of power values 118 may include a number of entries. The number of entries may be defined based on an evaluation of the number of entries to provide to the machine learning model 120 as input. For example, remote computing system 126 may evaluate a comparison between an output of the machine learning model 120 and an output of the deterministic function 138 (e.g., ground truth) for various numbers of entries. The remote computing system 126 may determine a number of entries (e.g., 20 entries, 41 entries, 95 entries, etc.) with a minimal difference between the output of the machine learning model 120 and the output of the deterministic function 138. As an example, if the number of entries is determined to be 20 and each entry corresponds to a power value collected 5 seconds apart, the array of power values 118 may include 100 seconds of time series data.

The array constructor 104 may input the array of power values 118 into the machine learning model 120. In some cases, the array constructor 104 may input the second array of power values 118 into the machine learning model 120. The array constructor 104 may input respective arrays of power values 118 into the machine learning model 120 periodically, based on a schedule, or responsive to an event.

The state detector 106 can be designed, constructed, and operational to determine a state of the television 142. The state of the television 142 may include an on state, an off state, a standby state, a sleep state, a hibernation state, an updating state, a power saving state, a night state, a dim screen state, among other types of states. The state detector 106 may determine the state of the television 142 based on output from the model generated with the array of power values 118 as input. For example, the state detector 106 may determine the state of the television 142 is active based on the output. The state detector 106 may determine the state of the television 142 is inactive based on output from the model generated with the second array of power values 118 as input. In some implementations, active may indicate whether an audience is present in an environment including the television 142 and inactive may indicate whether no audience is present in the environment. In some cases, inactive may indicate that the television 142 is not displaying content, rendering content, or otherwise presenting content (e.g., a television show, a movie). The inactive state can include the television being in a standby mode where power is still being consumed. In some cases, active and inactive may be based on a probability or likelihood of the audience being present in the environment based on the type of state the television 142 is operating during the time period associated with the array of power values 118.

The action generator 108 can be designed, constructed, and operational to generate an action based on the determined state of the television 142. If the determined state of the television 142 is inactive, the action generator 108 may prevent execution of the action. If the determined state of the television 142 is active, the action generator 108 may execute the action. The action may be an action to evaluate a performance of content rendered by the television 142. The action may be an action to identify further (e.g., subsequent) content to be rendered by the television 142 based on matching audio signatures. The action can include, for example, initiation, invocation, or execution of a digital performance survey to obtain performance feedback associated with content rendered or displayed on the television. The action can include polling, pinging, or launching digital resources on the computing system 102 or other computing systems or client devices that are linked with the computing system 102 or account thereof.

The performance manager 114 can be designed, constructed, and operational to process feedback 122 and determine performance of content rendered via the television 142. The performance manager 114, via the connection manager 112, may provide the feedback 122 to the remote computing system 126 to cause the remote computing system 126 to update the machine learning model 120 based on the feedback. For example, the feedback 122 may indicate that an audience is present in an environment including the television 142. If the output of the machine learning model indicated that that state of the television 142 was inactive when the feedback 122 was obtained, the remote computing system 126 may use the feedback 122 to retrain or update the machine learning model 120. The performance manager 114, via the connection manager 112, may provide the feedback 122 to the remote computing system 126 to cause the remote computing system 126 to control subsequent content rendered via the television 142 based on the feedback 122. For example, the feedback 122 may indicate the content rendered is undesirable to an audience. The remote computing system 126 may determine subsequent content to be different from the previous content based on the feedback 122.

Figure 2:
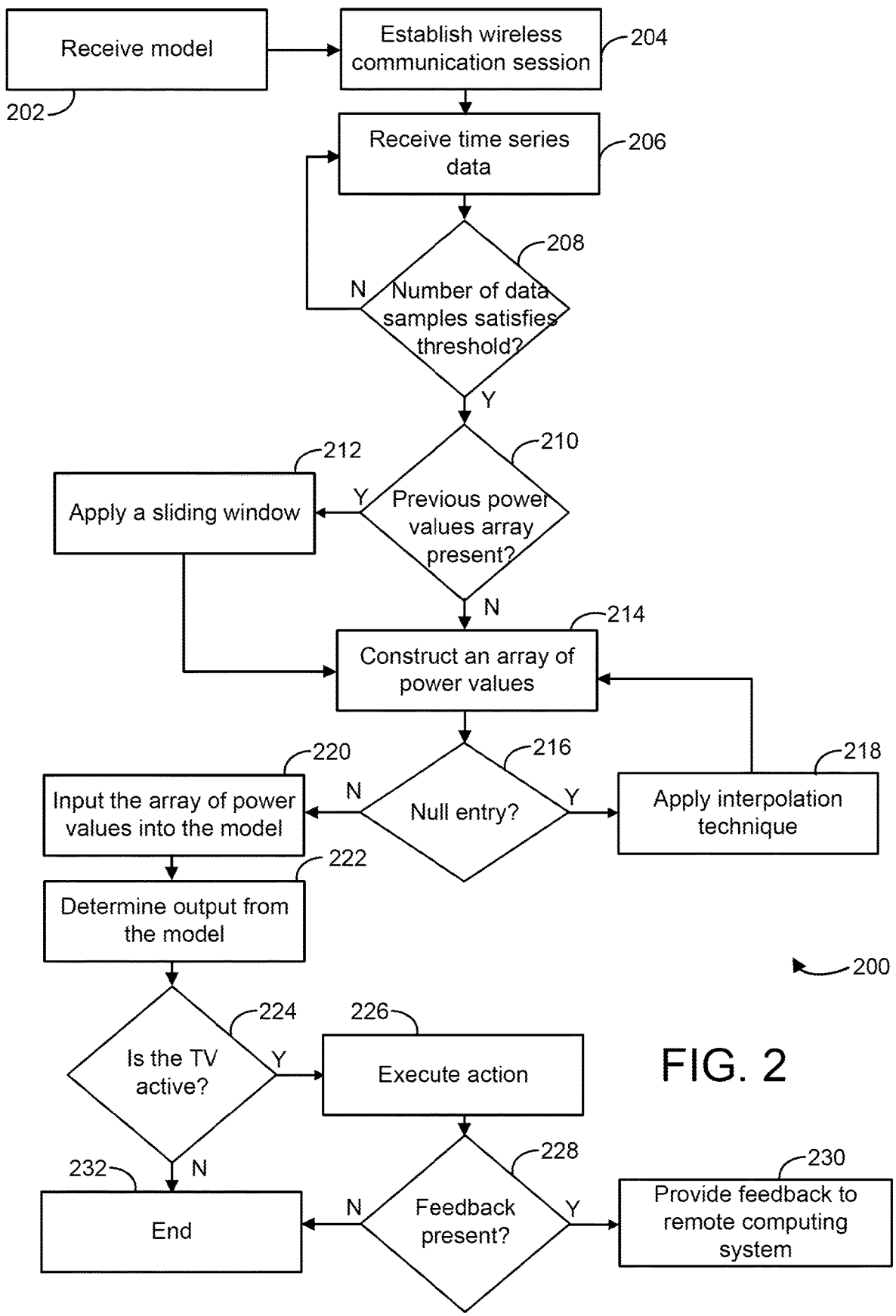
FIG. 2 depicts an example flow chart of a method for detecting television state based on machine learning, according to an embodiment.

FIG. 2 depicts an example flow chart of a method 200 for detecting television state based on machine learning. The method 200 can be performed by one or more systems or components depicted in FIG. 1 or FIG. 4, including, for example, a computing system 102, a remote computing system 126, a power sensor 144, or a television 142. While the acts of the method 200 are described according to an order, any subset or all of the acts may be performed in any order, simultaneously, or omitted.

Some systems may use one or more functions or techniques to detect a state of a television using a power sensor. The functions may include calculations based on thresholding. For example, if an observed power value coming from the power sensor connected to the television is above a power threshold, the algorithm may determine the television is on, if below the power threshold, off. However, with an increase in power saving techniques and television technologies (e.g., QLED, OLED), various power behaviors (e.g., using power during firmware updates, while in standby mode, various spikes) of the television caused by the power saving techniques and at different thresholds based on the type of television technology present in the television may result in misreports of the television state. Additionally, calibration may be used to setup operating conditions of the system including the algorithms, which may be individual to each television (e.g., each household including a different type of television).

The techniques described herein can overcome the aforementioned technical difficulties by being expandable (e.g., based on subsequent power behaviors being added to a training set for a machine learning model training process) and reducing or eliminating at least portions of the calibrations process (e.g., due to the model being agnostic to the type of television, no thresholds to adjust). At ACT 202, a computing system can receive a model. The computing system may receive the machine learning model from a remote computing system. The computing system can be preconfigured with the machine learning model. The computing system may receive an updated machine learning model periodically, based on a schedule, or responsive to an event. The machine learning model may be trained by the remote computing system via machine learning using training data sets based on time series data collected by power sensors coupled with televisions.

At ACT 204, the computing system can establish a wireless communication session. The computing system can establish the wireless communication session with the remote computing system, the television, the power sensor, a network, or any other entity. The wireless communication session may use any form of wireless technology (e.g., Wi-Fi, Bluetooth, near field communication (NFC), broadcast, mobile communication, network communication, etc.).

The computing system can, at ACT 206, receive time series data. The computing system can receive the time series data from the communication session. The computing system can receive the time series data from another means (e.g., physically uploaded, electrically, a wired connection, etc.).

At ACT 208, the computing system can determine whether a number of data samples satisfies a threshold. The computing system can determine a number or a threshold of data samples (e.g., a size of an array of power values) to input into the machine learning model. The computing system can determine whether a number of time series data points have been received to satisfy the threshold (e.g., to file the array of power values). At ACT 210, the computing system can determine whether a previous power value array is present. If the previous power value is present, at ACT 212, the computing system can apply a sliding window. The computing system can apply the sliding window to the previous power value array and the time series data. The computing system can apply the sliding window to construct a second array of power values based on a combination of the previous power value array and the time series data. The sliding window may remove previous entries in the power value array and include subsequent entries in the power value array based on the size of the power value array and the number of time series data present.

At ACT 214, the computing system can construct an array of power values. The computing system can construct the array of power values from the time series data. Computing system can apply one or more data cleaning or processing techniques on the time series data to construct the array of power values. The array of power values may include power values associated with the television during different time periods. At ACT 216, the computing system can determine if there is a null entry in the array of power values. If there is a null entry in the array of power values, at ACT 218, the computing system can apply an interpolation technique. The computing system may generate a power value based on the interpolation technique to populate the null entry. The computing system may construct the array of power values with the value generated via the interpolation technique.

At ACT 220, the computing system can input the array of power values into the model. The model may be trained based on log files of data collected from multiple power sensors coupled with multiple televisions. The model may generate output indicating a state of the television during a period of time based on the array of power values. At ACT 222, the computing system can determine the output from the model. At ACT 224, the computing system can determine whether a television is active. If the output from the model indicates that the television is active, at ACT 226, the computing system can execute an action. The action can be an action to evaluate a performance of content rendered by the television. The evaluation may be based on a reaction of an audience, feedback from the audience, video or photo data of the audience, or other types of data based on audience interaction (or the lack thereof) with the content. The action may be based on matching audio signatures. If the television is inactive, at ACT 232, the computing system can end the process. The computing system may prevent execution of the action responsive to the determination that the television is inactive.

At ACT 228, the computing system can determine whether feedback is present. The feedback may be input by the audience into a user interface of the computing system. The feedback may be tracked or obtained by one or more sensors (e.g., optical sensors, video cameras, audio sensors, pressure sensors, proximity sensors, etc.) of the computing system. The computing system can determine the performance of the content rendered via the television based on the feedback. If the feedback is present, at ACT 230, the computing system can provide the feedback to a remote computing system. The remote computing system may update the model based on the feedback (e.g., the feedback may indicate whether an audience is present while the content is being rendered, if the audience is present during a state of the television). The remote computing system may generate one or more labels for training the machine learning model based on the feedback. The remote computing system may control subsequent content rendered via the television based on the feedback.

Figure 3:
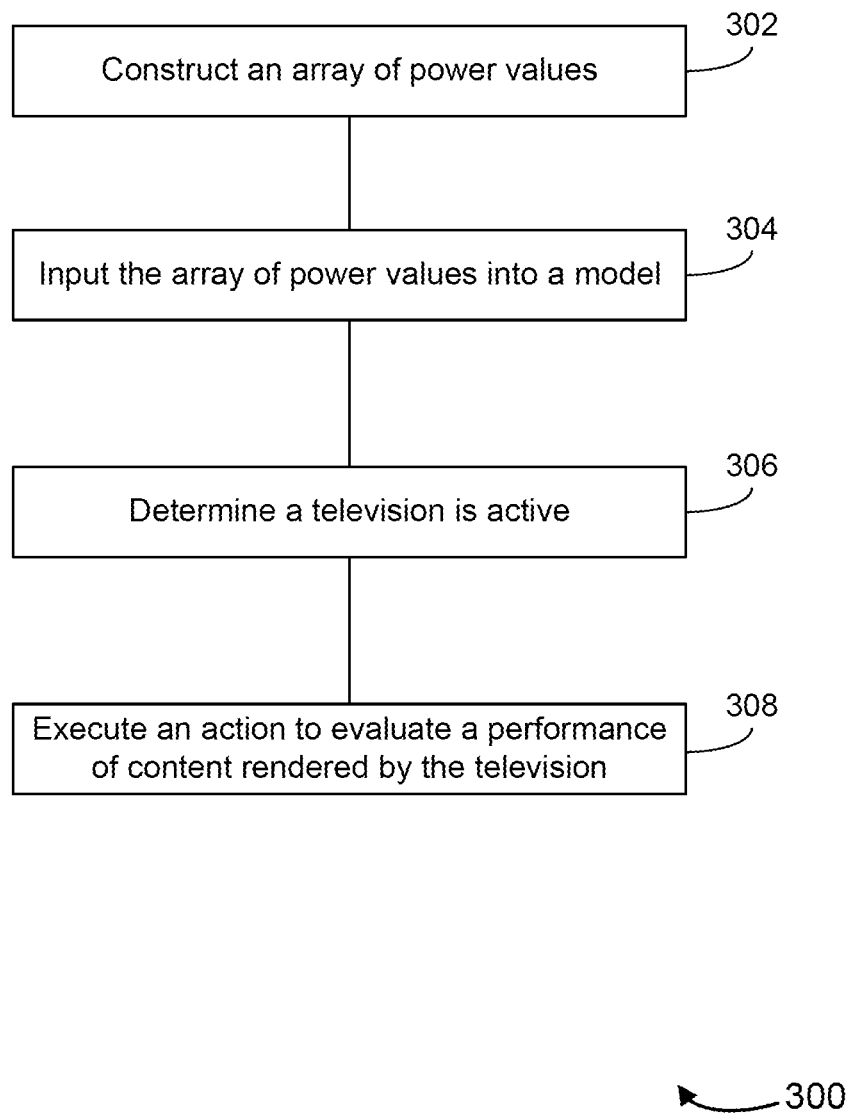
FIG. 3 depicts an example flow chart of a method for detecting television state based on machine learning, according to an embodiment.

FIG. 3 depicts an example flow chart of a method 300 for detecting television state based on machine learning. The method 300 can be performed by one or more systems or components depicted in FIG. 1 or FIG. 4, including, for example, a computing system 102, remote computing system 126, or television 142. While the steps of the method 300 are described according to an order, any subset or all of the steps may be performed in any order, simultaneously, or omitted. At ACT 302, the computing system can construct an array of power values. The computing system can construct the array of power values from time series data. The computing system can obtain the time series data from a power sensor coupled with a television.

At ACT 304, the computing system can input the array of power values into a model. The computing system can input the array of power values into the model trained with machine learning based on log files. The log files can include data collected from a plurality of power sensors coupled with a plurality of televisions.

At ACT 306, the computing system can determine the television is active. The computing system can determine the television is active based on output from the model generated with the array of power values.

At ACT 308, the computing system can execute an action. The computing system can execute the action responsive to the determination that the television is active. The computing system can execute the action to evaluate a performance of content rendered by the television.

FIG. 4 depicts an example block diagram of an example computer system 400. The computer system or computing device 400 can include or be used to implement a computing system or its components. The computing system 400 includes at least one bus 405 or other communication component for communicating information and at least one processor 410 or processing circuit coupled with the bus 405 for processing information. The computing system 400 can also include one or more processors 410 or processing circuits coupled with the bus for processing information. The computing system 400 also includes at least one main memory 415, such as a random-access memory (RAM) or other dynamic storage device, coupled with the bus 405 for storing information, and instructions to be executed by the processor 410. The main memory 415 can be used for storing information during execution of instructions by the processor 410. The computing system 400 may further include at least one read only memory (ROM) 420 or other static storage device coupled with the bus 405 for storing static information and instructions for the processor 410. A storage device 425, such as a solid-state device, magnetic disk or optical disk, can be coupled with the bus 405 to persistently store information and instructions.

The computing system 400 may be coupled via the bus 405 to a display 435, such as a liquid crystal display, or active-matrix display, for displaying information to a user such as an end user. An input device 430, such as a keyboard or voice interface may be coupled with the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system of state-based performance evaluation of televisions via machine learning, comprising:
   a computing system comprising one or more processors, coupled with memory, to:
   construct an array of power values from time series data collected by a power sensor coupled with a television;
   identify an entry in the array of power values that is null;
   apply an interpolation technique to the array of power values to generate a value to populate the entry;
   update the array of power values with the value generated via the interpolation technique;
   input the array of power values into a model trained with machine learning based on log files of data collected from a plurality of power sensors coupled with a plurality of televisions;
   determine, based on output from the model generated with the array of power values, the television is active; and
   execute, responsive to the determination that the television is active, an action to evaluate a performance of content rendered by the television.

2. The system of claim 1, comprising:
   the computing system to receive the time series data from the power sensor.

3. The system of claim 1, comprising the computing system to:
   receive second time series data from the power sensor;

apply a sliding window to construct a second array of power values based on a combination of the second time series data and the time series data;

determine, via the model, the television is inactive based on the second array of power values; and prevent execution of the action responsive to the determination that the television is inactive.

4. The system of claim 1, comprising the computing system to:

establish a wireless communication session with the power sensor; and receive, via the wireless communication session, the time series data.

5. The system of claim 1, comprising the computing system to:

receive, responsive to execution of the action, feedback via an input interface; and determine the performance of the content rendered via the television based on the feedback.

6. The system of claim 1, comprising the computing system to:

receive, responsive to execution of the action, feedback via an input interface; and provide, via a network, the feedback to a remote computing system to cause the remote computing system to update the model based on the feedback.

7. The system of claim 1, comprising the computing system to:

receive, responsive to execution of the action, feedback via an input interface; and provide, via a network, the feedback to a remote computing system to cause the remote computing system to control subsequent content rendered via the television based on the feedback.

8. The system of claim 1, comprising:

the computing system to receive, via a network, the model from a remote computing system, wherein the remote computing system is configured to:

receive the log files of data collected from the plurality of power sensors coupled with the plurality of televisions;

apply a data cleaning technique to the data of the log files to generate a cleaned data set;

apply a normalization technique to the cleaned data set to generate a normalized data set;

remove, from the normalized data set, spikes via a filter to generate a filtered data set;

interpolate missing values in the filtered data set to generate a training data set; and train, via machine learning, the model with the training data set.

9. The system of claim 1, wherein the model is trained with a training data set generated based on the log files of data collected from the plurality of power sensors, wherein the training data set includes labels generated based on output of a deterministic function applied to the data of the log files.

10. The system of claim 1, wherein the model comprises a long short-term memory network.

11. A method of state-based performance evaluation of televisions via machine learning, comprising:

constructing, by a computing system comprising one or more processors coupled with memory, an array of power values from time series data collected by a power sensor coupled with a television;

receiving, by the computing system via a network, a model from a remote computing system, wherein the remote computing system is configured to:

receive log files of data collected from a plurality of power sensors coupled with a plurality of televisions;

apply a data cleaning technique to the data of the log files to generate a cleaned data set;

apply a normalization technique to the cleaned data set to generate a normalized data set;

remove, from the normalized data set, spikes via a filter to generate a filtered data set;

interpolate missing values in the filtered data set to generate a training data set; and train, via machine learning, the model with the training data set;

inputting, by the computing system, the array of power values into the model trained with machine learning based on the log files of data collected from the plurality of power sensors coupled with the plurality of televisions;

determining, by the computing system, based on output from the model generated with the array of power values, the television is active; and executing, by the computing system, responsive to the determination that the television is active, an action to evaluate a performance of content rendered by the television.

12. The method of claim 11, comprising:

receiving, by the computing system, the time series data from the power sensor.

13. The method of claim 11, comprising:

receiving, by the computing system, a second time series of power values from the power sensor;

applying, by the computing system, a sliding window to construct a second array of power values based on a combination of the second time series of power values and the time series data;

determining, by the computing system via the model, the television is inactive based on the second array of power values; and preventing, by the computing system, execution of the action responsive to the determination that the television is inactive.

14. The method of claim 11, comprising:

establishing, by the computing system, a wireless communication session with the power sensor; and receiving, by the computing system via the wireless communication session, the time series data.

15. The method of claim 11, comprising:

identifying an entry in the array of power values that is null;

applying, by the computing system, an interpolation technique to the array of power values to generate a value to populate the entry; and constructing, by the computing system, the array of power values with the value generated via the interpolation technique.

16. The method of claim 11, comprising:

receiving, by the computing system responsive to execution of the action, feedback via an input interface; and determining, by the computing system, the performance of the content rendered via the television based on the feedback.

17. The method of claim 11, comprising:

receiving, by the computing system, responsive to execution of the action, feedback via an input interface; and providing, by the computing system via a network, the feedback to a remote computing system to cause the remote computing system to update the model based on the feedback.

18. The method of claim 11, comprising:
receiving, by the computing system, responsive to execution of the action, feedback via an input interface; and
providing, by the computing system via a network, the feedback to a remote computing system to cause the remote computing system to control subsequent content rendered via the television based on the feedback.

\* \* \* \* \*